United States Patent
Macdonald et al.

(10) Patent No.: US 6,662,867 B1
(45) Date of Patent: Dec. 16, 2003

(54) CONTROLLED HEATING OF A COATING MATERIAL

(75) Inventors: Frank Joseph Macdonald, Granville, OH (US); Ramesh K. Patel, New Albany, OH (US); David Paul Aschenbeck, Newark, OH (US)

(73) Assignee: Owens-Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/699,694

(22) Filed: Oct. 30, 2000

(51) Int. Cl.[7] .............................. G05D 23/00; F27B 9/12
(52) U.S. Cl. ..................... 165/289; 165/61; 165/201; 432/11; 432/12; 432/18; 432/29; 366/7
(58) Field of Search ................. 165/201, 289, 165/292, 299, 300; 432/4, 8, 9, 11, 12, 14, 18, 48, 29, 49; 366/2, 6, 7, 22, 25, 142, 144, 145, 149; 156/260, 264, 269, 270, 271

(56) References Cited

U.S. PATENT DOCUMENTS

| | | | | |
|---|---|---|---|---|
| 2,001,344 A | * | 5/1935 | Fielder | ................. 165/292 |
| 2,223,551 A | * | 12/1940 | Carson | ................. 165/292 |
| 2,255,986 A | * | 9/1941 | Rapisarda | .......... 165/289 X |
| 2,847,166 A | * | 8/1958 | Smith | .......... 165/289 X |
| 3,751,014 A | * | 8/1973 | Waterloo | .......... 165/289 X |
| 3,797,453 A | * | 3/1974 | Rizzo | |
| 3,857,552 A | | 12/1974 | Ohlson | |
| 3,882,475 A | * | 5/1975 | Moore et al. | |
| 4,024,834 A | | 5/1977 | Carter | |
| 4,055,453 A | * | 10/1977 | Tajima et al. | |
| 4,155,654 A | * | 5/1979 | Kennepohl et al. | ..... 366/144 X |
| 4,156,455 A | * | 5/1979 | van der Meulen | .......... 165/292 |
| 4,475,818 A | | 10/1984 | Bialkowski | |
| 4,574,870 A | * | 3/1986 | Weitman | ............. 165/292 |
| RE32,206 E | * | 7/1986 | Bracegirdle | ............. 366/7 |
| 4,638,851 A | * | 1/1987 | Makihara et al. | ........... 165/289 |
| 5,098,787 A | * | 3/1992 | Komatsu et al. | |
| 5,100,239 A | * | 3/1992 | Ono et al. | ............. 366/7 |
| 5,174,650 A | * | 12/1992 | McFarland et al. | ....... 366/25 X |
| 5,322,367 A | * | 6/1994 | Nath et al. | ............. 432/14 X |
| 5,494,728 A | | 2/1996 | Vermilion et al. | |
| 5,607,231 A | * | 3/1997 | Loesch | ............. 366/7 |
| 5,626,659 A | * | 5/1997 | Chivers | |
| 5,755,900 A | | 5/1998 | Weir et al. | |
| 5,988,864 A | * | 11/1999 | Bracegirdle | ........... 366/6 X |
| 6,123,879 A | * | 9/2000 | Hendrix et al. | |
| 6,355,132 B1 | * | 3/2002 | Becker et al. | ........... 156/260 |
| 6,478,461 B1 | * | 11/2002 | Frank | ............. 366/25 |

* cited by examiner

*Primary Examiner*—Ljiljana Ciric
(74) *Attorney, Agent, or Firm*—Inger H. Eckert; James J. Dottavio

(57) ABSTRACT

In a process to control the heating of a coating material for a roof covering, the coating material is heated using a heat exchange medium in a continuous process. The heat exchange medium is cooled in response to a slowdown or stoppage of the continuous heating process to maintain the temperature of the coating material below a predetermined level.

9 Claims, 3 Drawing Sheets

CONTROLLED HEATING OF A COATING MATERIAL

TECHNICAL FIELD AND INDUSTRIAL APPLICABILITY OF THE INVENTION

The present invention is related generally to processes for the manufacture of roof coverings, and more particularly to a process of controlled heating of a coating material for a roof covering.

BACKGROUND OF THE INVENTION

Processes for the manufacture of roof coverings, such as roofing shingles or roll roofing, usually include a step of applying a molten coating material to a substrate, followed by a step of applying roofing granules to a surface of the coated substrate. In a typical process, the coating material is a mixture of asphalt and a filler such as ground limestone. The filler is heated before mixing it with heated asphalt to form the molten coating material. In most processes, the filler is heated by passing it through a filler heater that uses a fluid such as heated oil as a heat exchange medium.

Increasing the temperature of the molten coating material reduces its viscosity. It is desirable to maintain the viscosity of the molten coating material within a predetermined range when it is applied to the substrate, to insure good coating of the substrate and good application of the granules. At times, the continuous manufacturing process may be slowed down or stopped intentionally or unintentionally for various reasons. During such times, the filler remains inside the filler heat longer than usual. The increased heating may cause the temperature of the filler to increase above a desired temperature. When the overly heated filler is mixed with the asphalt, the temperature of the resulting coating material may be too high and the viscosity of the coating material too low. As a result, it may lead to processing problems, quality problems, or even to scrapping the resulting product. Therefore, it would be desirable to provide a process to control the heating of the filler during slowdown or stoppage of the process, in order to control the viscosity of the coating material. The resulting improvement in consistency of the filled coating viscosity may lead to improved consistency in granule penetration and, therefore, improved aesthetic properties of the roofing shingles, such as a reduction in shading.

U.S. Pat. No. 3,857,552 to Ohlson discloses a process of making an asphalt concrete mix, in which a mineral aggregate for the concrete mix is heated in a heating drum by use of an oil burner. The oil burner can be adjusted to a desired heating temperature by adjusting the supply of oil to the burner. However, there is no suggestion to heat the aggregate using a heat exchange medium, and no suggestion to cool a heat exchange medium in order to maintain the temperature of the aggregate below a predetermined level.

U.S. Pat. No. 4,475,818 to Bialkowski discloses a process of making an asphalt coating mix, in which the ratio of limestone to asphalt in the mix is adjusted to control the viscosity of the mix. During the process, the limestone is heated in a heating chamber, but there is no suggestion to heat the limestone using a heat exchange medium. Further, there is no suggestion to cool a heat exchange medium to maintain the temperature of the limestone below a predetermined level.

SUMMARY OF THE INVENTION

The above object as well as others not specifically enumerated are achieved by a process to control the heating of a coating material for a roof covering according to the invention. The coating material is heated using a heat exchange medium in a continuous process. The heat exchange medium is cooled in response to a slowdown or stoppage of the continuous heating process to maintain the temperature of the coating material below a predetermined level.

In another embodiment, the invention relates to a process to control the heating of a coating material for a roof covering. The coating material is heated to a first coating material temperature using a heat exchange medium at a first flow rate of the coating material. The temperature of the heat exchange medium is adjusted to accomplish a second coating material temperature at a second flow rate of the filler, where the second flow rate is less than the first flow rate.

In another embodiment, the invention relates to a process to control the viscosity of an asphalt coating for a roof covering. A filler for the asphalt is heated to a first filler temperature using a heat exchange medium at a first flow rate of the filler. The temperature of the heat exchange medium is adjusted to accomplish a second filler temperature at a second flow rate of the filler, where the second flow rate is less than the first flow rate.

Various objects and advantages of this invention will become apparent to those skilled in the art from the following detailed description of the preferred embodiment, when read in light of the accompanying drawings.

DETAILED DESCRIPTION AND PREFERRED EMBODIMENTS OF THE INVENTION

Figure 1:
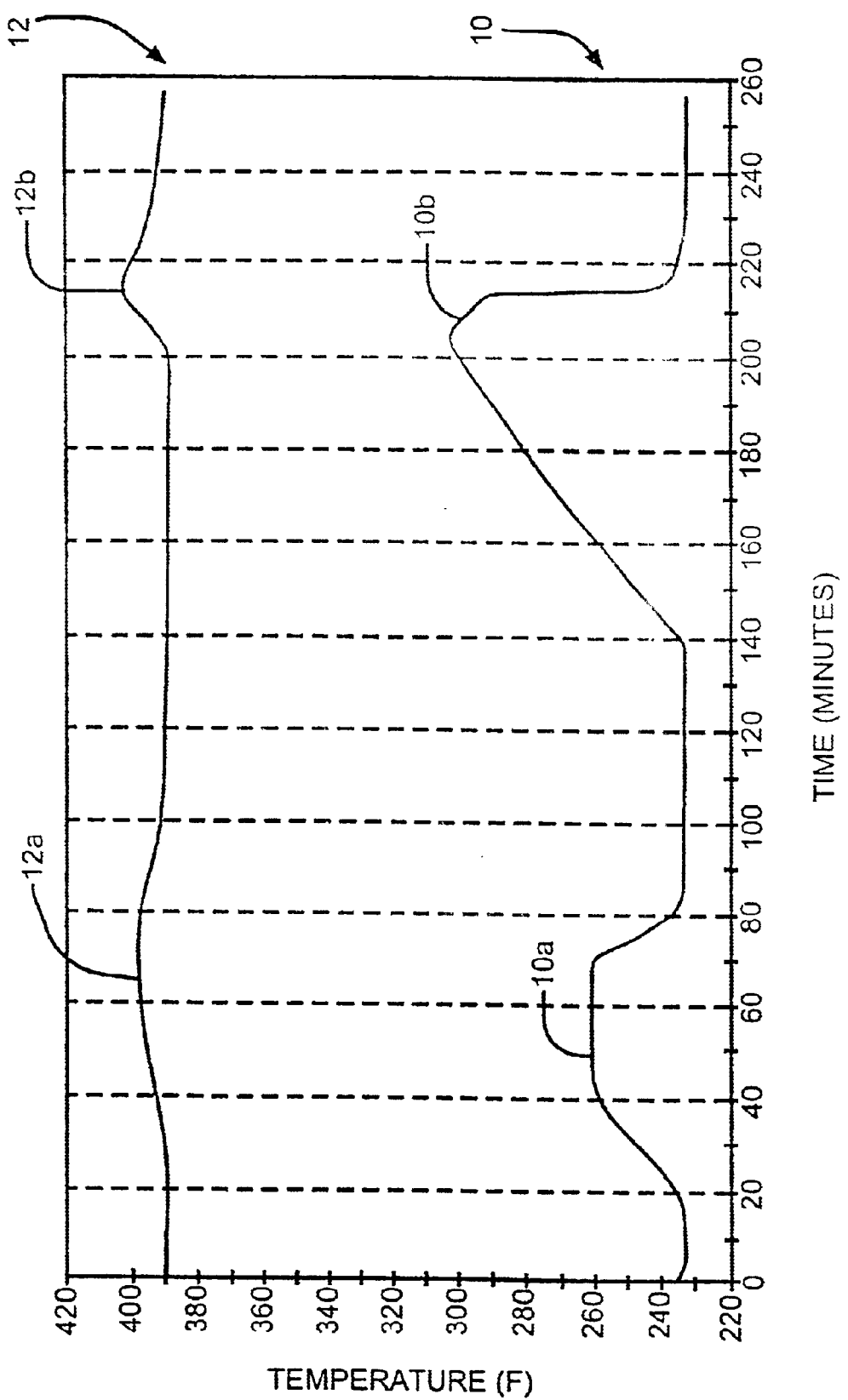
FIG. 1 is a graph of temperature versus time for a filler as it exits a filler heater, and for a coating material containing the heated filler in a surge tank, showing slowed down and stopped conditions in a prior art heating process that does not include the controlled heating of the present invention.

Referring now to the drawings, FIG. 1 illustrates the problem of temperature increase of the filler and the filled coating that may occur when a continuous process for manufacturing roofing shingles is slowed down and stopped. Specifically, FIG. 1 shows a plot 10 of temperature versus time for a filler as it exits a filler heater during the process, and a plot 12 of temperature versus time for a filled coating in a surge tank (after the heated filler has been mixed with hot asphalt to form the filled coating). The illustrated plots are taken from a process that does not include the controlled heating of the present invention. The plots are based on a filler heater model developed for heat exchangers using hot oil as the heat exchange medium. The plots are initiated after running the model under typical conditions where the hot oil is supplied at a constant temperature of 450° F.

Two process upset conditions are shown in FIG. 1: a slow time condition (where the process is slowed down) and a stopped line condition (where the process is stopped). The slow time condition is shown in the plots 10 and 12 at regions 10a and 12a, respectively. In the slow time condition, the filler spends a longer time inside the filler heater, so the temperature of the filler at the exit (shown at 10a) is higher than during full speed conditions. A temperature balance is eventually reached at a level somewhat higher than full speed settings. The temperature of the filled coating in the surge tank (shown at 12a) rises about 11° F. compared to the full speed temperature. The delay in temperature rise of the filled coating is due to the fact that the heated filler, after being mixed with heated asphalt, is dumped into a large tank with filled coating at a lower temperature.

The stopped line condition is shown in the plots 10 and 12 at regions 10b and 12b, respectively. In the stopped line condition, the coater has been shut down and there is no filled coating being called for. Consequently, the filler in the filler heater continues to be exposed to the 450° F. hot oil and, therefore, rises gradually in temperature (shown at 10b). When the line is restarted, this slug of hot filler is pushed through the process and causes a spike in the filled coating temperature (shown at 12b). Specifically, the temperature of the filled coating typically rises about 15° F. compared to the full speed temperature. It takes about 10 minutes to get this slug out of the heat exchanger at full speed.

For a typical filled coating, the 11° F. and 15° F. increases in filled coating temperature cause drops in coating viscosity of about 20% and 27%, respectively. This is a significant change in viscosity and could cause further upsets to the process or produce roofing shingles that are not optimized for material efficiency (e.g., lower viscosity coating may retain more granules than normal). Consequently, there is a need for a way to maintain the viscosity of the filled coating during slowed down and stopped process conditions.

In the case of the stopped line, it has been considered that closing off the hot oil flow to the filler heater would decrease the temperature rise of the filler until the line could be restarted. The problem with this approach is that there is so much thermal mass in the filler heater at 450° F. (steel and hot oil), that the filler would continue to rise in temperature until the steel, oil and filler all reached an equilibrium at about 370° F. Therefore, another solution is needed to this problem.

The present invention addresses this need by providing a process of controlled heating of a coating material for a roof covering. The coating material can be any type of coating material suitable for use on a roof covering. Typically, a coating material for roofing shingles includes asphalt and a filler of finely ground inorganic particulate matter, such as ground limestone. The coating material can also include various additives and/or modifiers such as polymers. The term "coating material", as used herein, means any type of coating material or any component of such a coating material, such as the filler or the asphalt of a filled coating. The roof covering can be any type of roof covering, such as three-tab roofing shingles, laminated roofing shingles, roll roofing, or built-up roofing.

The controlled heating process of the invention is applicable to any process in which the coating material is heated by use of a heat exchange medium. Any type of heat exchange medium suitable for transferring heat to the coating material can be used. Typically, the heat exchange medium is a heated fluid, such as hot oil, hot air, or high-pressure steam. In a preferred embodiment, the heat exchange medium is hot oil. The coating material is usually heated by the heat exchange medium in a piece of equipment called a heat exchanger. Any suitable type of heat exchanger can be used, such as a fluidized bed heat exchanger, a spiral auger heat exchanger, or a plate heat exchanger. Preferably, the heat exchanger is a spiral auger type heat exchanger, such as a HOLO-FLITE, manufactured by Svedala Pumps & Processes.

The controlled heating process of the invention addresses the problem of the undesired temperature increase of the coating material that may occur when it is heated using a heat exchange medium, for example during a slow time condition or a stopped line condition of a continuous manufacturing process. The controlled heating process involves the step of actively cooling down the heat exchange medium in order to maintain the temperature of the coating material below a predetermined level. For example, the process may be used to reduce or eliminate the temperature spikes of the filled coating that occur during slow time and stopped line conditions.

The heat exchange medium can be cooled down in any manner that is effective to maintain the temperature of the coating material below the predetermined level. In a preferred embodiment, the cooling step involves circulating the heat exchange medium through a separate loop, and cooling the heat exchange medium while it is located in the loop. The heat exchange medium can be cooled in the loop in any suitable manner, such as with a cooling device or through heat transfer between the loop and the surrounding environment. Preferably, the heat exchange medium is cooled by use of a cooling device such as a heat exchanger in the loop.

Figure 2:
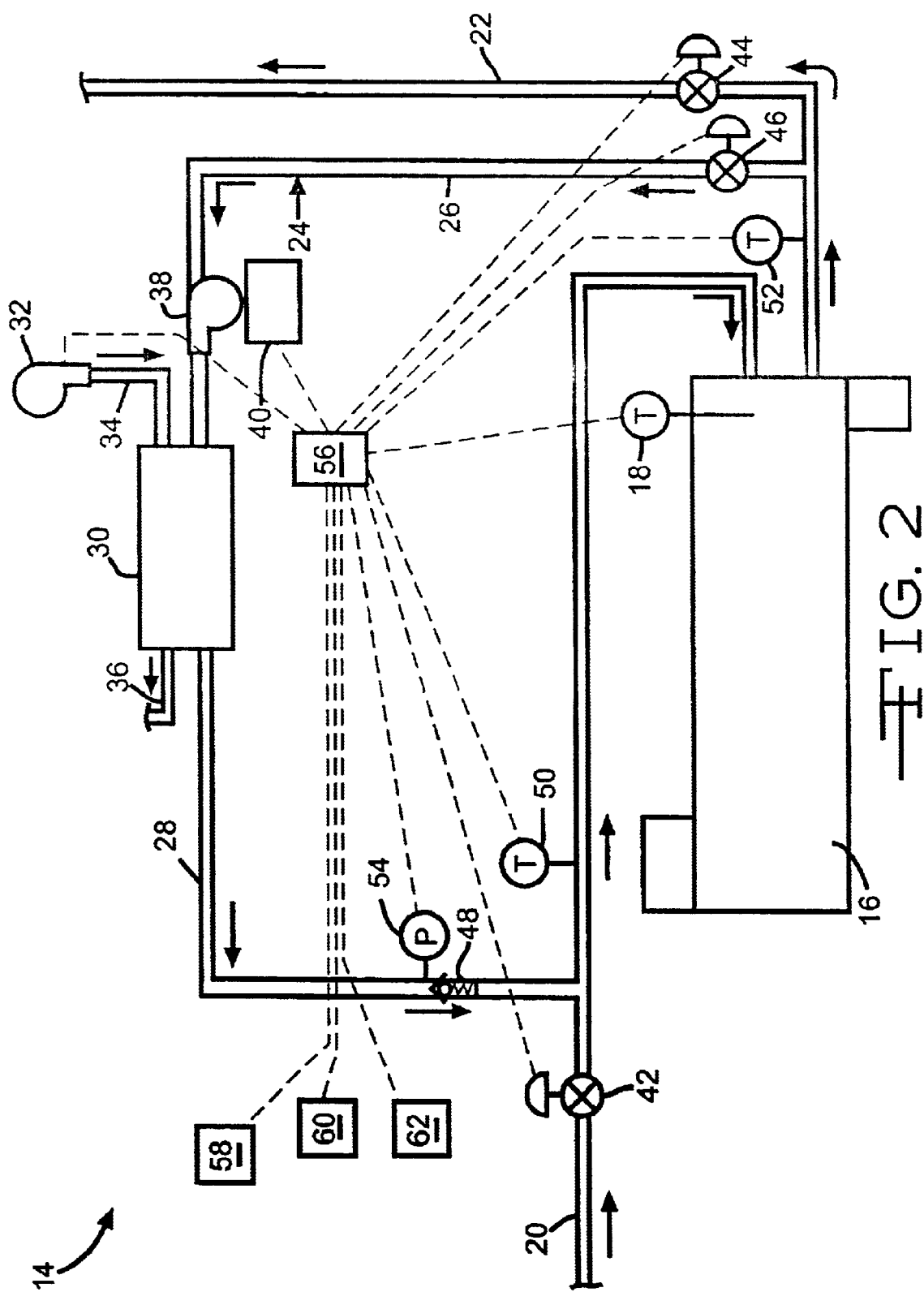
FIG. 2 is a schematic view of apparatus for use in a process of controlled heating of a filler for a coating material according to the present invention.

FIG. 2 illustrates a preferred embodiment of apparatus 14 for use in a process of controlled heating a filler for a roofing shingle according to the invention. The apparatus includes a filler heater 16 for heating the filler. A filler thermocouple 18 is mounted on the filler heater to measure the temperature of the filler at the outlet of the filler heater. The filler heater is operated using hot oil as the heat exchange medium. The hot oil is supplied to the filler heater through an oil input conduit 20, and it leaves the filler heater through an oil output conduit 22. Under normal conditions, the manufacturing line runs at full speed, the hot oil is supplied to the filler heater at a constant temperature, and the filler heater augers turn at constant rpm. The temperature of the filler at the outlet of the filler heater reaches an equilibrium, dependent on filler properties, heat transfer coefficients and hot oil temperature and flow.

In a stopped line condition, the filler remains in contact with the hot steel augers of the filler heater for a longer period of time than normal. In a process that does not include the controlled heating of the invention, the temperature of the filler gradually rises to an undesired level. To avoid this undesired rise in temperature, the present invention provides a loop 24 in the apparatus for cooling the hot oil. The loop includes a loop input conduit 26 and a loop output conduit 28. An oil cooler 30 is installed in the loop for cooling the hot oil. Any type of cooling device suitable for cooling the hot oil can be used, such as various types of heat exchangers. Preferably, the oil cooler is a plate-type heat exchanger such as those manufactured by Tranter Co. In the illustrated embodiment, a water pump 32, or a solenoid valve (not shown) to open to process water, supplies cooling water to the oil cooler through a supply conduit 34, and the water leaves the oil cooler through a return conduit 36. An oil pump 38 powered by an oil pump drive 40 is provided in the loop before the oil cooler, to pump the hot oil through the loop.

When a stopped line condition occurs, oil input valve 42 is shut off and oil output valve 44 is nearly closed to isolate the hot oil in the loop 24. Loop input valve 46 is opened, and the hot oil flows into the loop input conduit and the oil cooler. The water pump is started to pump cooling water through the oil cooler. The oil pump drive is started and ramped up to full speed to pump the hot oil through the oil cooler and through the loop output conduit. The oil that has been cooled in the oil cooler flows out of the loop output conduit 28 and back into the oil input conduit 20 leading to the filler heater 16. One-way check valve 48 in the loop output conduit 28 prevents the oil from flowing back into the loop. The cooled oil flows through the filler heater to prevent the undesired temperature rise of the filler during the stopped line condition. The temperature of the oil entering the filler heater is monitored by oil input thermocouple 50, and the temperature of the oil leaving the filler heater is monitored by oil output thermocouple 52. When the temperature of the oil leaving the filler heater reaches a desired (setpoint) temperature (e.g., about 250° F.), the oil pump 38 and the water pump 32 are shut down. Based on the model, an oil temperature reduction from 450° F. to 250° F. would eliminate the rise in filler temperature due to a stopped line condition.

When the manufacturing line starts up again in a slow speed condition, the oil pump drive 40 is started at a preset low speed, and the oil input valve 42 and oil output valve 44 are opened. A pressure gauge 54 in the loop 24 is monitored, and the oil pump drive is shut off if a maximum pressure setpoint is reached (in case of valve failures). The temperature of the oil at the oil input thermocouple 50 and the oil output thermocouple 52 rises quickly. The oil pump drive is controlled to approach and maintain another setpoint temperature (e.g., about 400° F.) at the oil input thermocouple required to maintain the desired filler temperature at slow speed settings. Based on the model, an oil temperature reduction from 450° F. to 400° F. would eliminate the rise in filler temperature due to a slow speed condition. A mixing of 450° F. oil through the oil input conduit with cooler oil from the loop would produce the desired setpoint temperature. The filler thermocouple 18 is monitored to check that the filler temperature maintains the desired range.

When full line speed is reestablished, the existing valve and pump settings are maintained for a prescribed delay period based on the periods of time that the line was stopped and at slow speed. If filler that was originally in the filler heater when the line was stopped is still inside the filler heater at this point, then it will still be above the normal temperature range for a full speed condition, and its temperature would spike upward if 450° F. oil was immediately supplied. When the time delay is passed, the oil pump 38 is shut down, the loop input valve 46 is closed, and the water pump 32 is turned off. The thermocouples 18, 50 and 52 are monitored to confirm that all is working as planned.

Preferably, the apparatus includes a controller 56 to control the operation of the system. At a minimum, it is preferred that the controller controls the circulation of the oil through the loop and the cooling of the oil in the loop, in response to inputs including the temperature of the filled coating and the temperature of the oil. In the illustrated embodiment, the controller receives inputs from the filler thermocouple 18, the oil input thermocouple 50, the oil output thermocouple 52 and the pressure gauge 54, as well as receiving an asphalt temperature input 58, a filled coating temperature input 60 and a line speed input 62. The controller sends outputs to the water pump 32, the oil pump drive 40, the oil input valve 42, the oil output valve 44 and the loop input valve 46.

Figure 3:
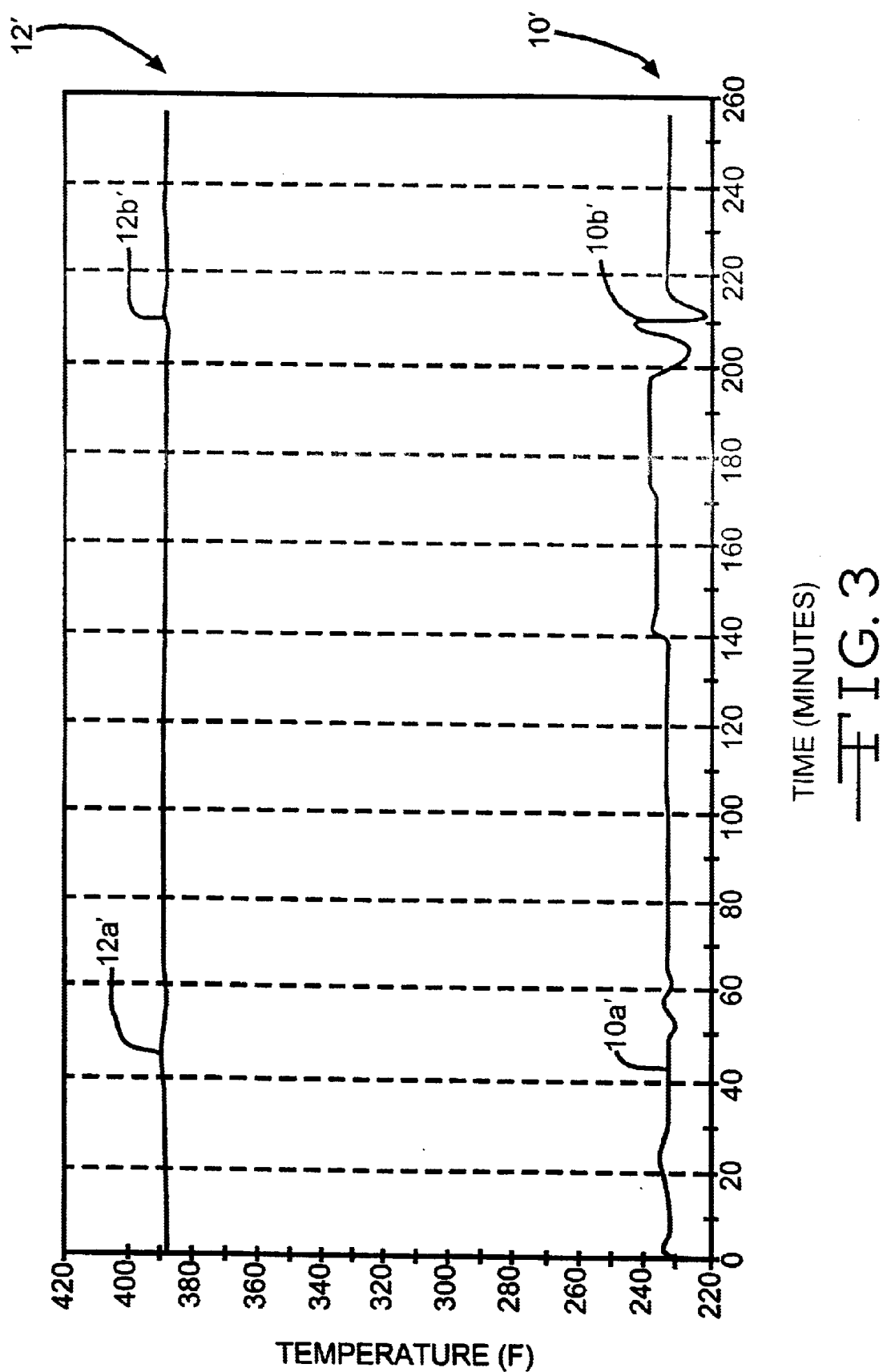
FIG. 3 is a graph like FIG. 1, except that the heating process includes the controlled heating of the present invention.

FIG. 3 illustrates the effectiveness of the invention in maintaining the normal temperatures of the filler and the filled coating when the stopped line and slow time conditions occur. The plot 10' is a plot of temperature versus time for the filler, and the plot 12' is a plot of temperature versus time for the filled coating. The slow time condition is shown in the plots 10' and 12' at regions 10a' and 12a', respectively. The stopped line condition is shown in the plots 10' and 12' at regions 10b' and 12b', respectively. It is seen that the controlled heating process of the invention greatly reduces the temperature increases of the filler and the filled coating caused by slow time and stopped line conditions. In the illustrated embodiment, the temperature rise of the filled coating is essentially eliminated. This will essentially eliminate the undesired reduction in viscosity of the filled coating. Preferably, the controlled heating process of the invention is effective to prevent the temperature of the filler from rising more than about 100° F. above the normal equilibrium temperature of the filler during the filler heating process, and is effective to limit the time of the temperature rise to a very short period of time (e.g., about 10 minutes or less) so that the filled coating temperature is substantially unaffected. Also preferably, the invention is effective to prevent the temperature of the filled coating from rising more than about 2° F. above the normal equilibrium temperature of the filled coating during the manufacturing process, and to prevent the viscosity of the filled coating from decreasing more than about 5% below the normal equilibrium viscosity of the filled coating during the manufacturing process.

The small spike in filler temperature at the end of the stopped line condition (shown at 10b') arose from switching back to 45° F. oil while higher temperature filler was still in the filler heater. The very short duration of this spike causes a negligible rise in filled coating temperature.

The controlled heating process of the invention could also be applied to the asphalt recirculation loop (not shown) of the manufacturing process. If the asphalt recirculation loop does not have a stable temperature during these periods of slowtime and downtime (or for any other reason), the process of the invention could be used to compensate for that variation. Changing the temperature of the asphalt recirculation loop can take a long time due to the amount of material flowing through it and its higher heat capacity. Based on modeling of the filler heater and the above-described equipment to cool the hot oil, filler temperatures can be adjusted much more quickly. The filler is approximately 65% (by weight) of the total filled coating mixture and is about half of the thermal mass, so the mixture temperature can be affected quickly. In order to control the filled coating temperature (the ultimate goal of this scheme) with varying asphalt temperature, inputs to the controller will need to bring in the asphalt loop temperature and the filled coating temperature. Control of the hot oil would then be driven by the filled coating temperature using known relationships between line speed, material flow rates and material temperatures.

The principle and mode of operation of this invention have been described in its preferred embodiment. However, it should be noted that this invention may be practiced otherwise than as specifically illustrated and described without departing from its scope. For example, while the controlled heating process of the invention has been illustrated as maintaining the temperature of the coating material below a predetermined level by preventing the temperature from rising above that level, the process could also maintain the temperature by lowering it after it rises. Furthermore, one skilled in the art appreciates that the present invention may be used to control the filled coating temperature by elevating the temperature of the filler, for example, if the asphalt was below the desired temperature, the temperature of the oil could be elevated to increase the filler temperature above the normal operating temperature, and thereby increase the thermal energy in the resultant mixture of asphalt and filler.

What is claimed is:

1. A method to control the heating of a filler for a filled asphalt coating for use in a roof covering, in order to control the viscosity of the filled asphalt coating, the method comprising:

flowing the filler through a heater in a continuous heating process, and heating the filler in the heater using a heat exchange medium;

monitoring the continuous heating process to detect a slowdown or stoppage thereof;

in response to the slowdown or stoppage, cooling the heat exchange medium using a cooling device to control the temperature of the filler by maintaining the temperature below a predetermined level;

mixing the heated filler with asphalt to produce the filled asphalt coating, wherein the controlling of the temperature of the filler results in controlling the viscosity of the filled asphalt coating by maintaining the viscosity within a predetermined range; and applying the filled asphalt coating to a substrate to produce the roof covering.

2. A method according to claim 1, wherein the cooling of the heat exchange medium comprises circulating the beat exchange medium through a loop and cooling the heat exchange medium using the cooling device which is disposed in the loop.

3. A method according to claim 2, wherein the cooling device is a heat exchanger.

4. A method according to claim 2, further comprising controlling the circulation of the heat exchange medium through the loop and the cooling of the heat exchange medium in the loop, in response to an input of a temperature of the filler and an input of a temperature of the heat exchange medium.

5. A method according to claim 2, wherein the heat exchange medium flows into the heater through an input conduit and flows out of the heater through an output conduit, and wherein the loop includes the heater and portions of the input and output conduits connected to the heater.

6. A method according to claim 1, wherein the filler reaches an equilibrium temperature during the continuous heating process, and wherein the cooling of the heat exchange medium is effective to prevent the temperature of the filler from rising more than about 10° F. above the equilibrium temperature.

7. A method according to claim 6, wherein the cooling of the heat exchange medium is effective to limit the time of the temperature rise to not more than about 10 minutes.

8. A method according to claim 1, wherein the filled asphalt coating reaches an equilibrium viscosity during the mixing, and wherein the maintaining of the temperature of the filler below the predetermined level prevents the viscosity of the filled asphalt coating from decreasing more than about 5% below the equilibrium viscosity.

9. A method according to claim 1, wherein the heat exchange medium is hot oil.

* * * * *